(12) United States Patent
Lynch et al.

(10) Patent No.: US 11,361,053 B2
(45) Date of Patent: *Jun. 14, 2022

(54) SYSTEMS AND METHODS FOR PAYLOAD ENCODING AND DECODING

(71) Applicant: The Nielsen Company (US), LLC, New York, NY (US)

(72) Inventors: Wendell Lynch, East Lansing, MI (US); Ronald D. Smith, Ellicott City, MD (US)

(73) Assignee: The Nielsen Company (US), LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/925,064

(22) Filed: Jul. 9, 2020

(65) Prior Publication Data

US 2020/0349237 A1 Nov. 5, 2020

Related U.S. Application Data

(63) Continuation of application No. 16/133,421, filed on Sep. 17, 2018, now Pat. No. 10,713,337, which is a
(Continued)

(51) Int. Cl.
*G06F 21/10* (2013.01)
*G06F 3/16* (2006.01)
(Continued)

(52) U.S. Cl.
CPC .......... *G06F 21/10* (2013.01); *G06F 3/16* (2013.01); *H04N 7/24* (2013.01);
(Continued)

(58) Field of Classification Search
None
See application file for complete search history.

(56) References Cited

U.S. PATENT DOCUMENTS 5,450,490 A 9/1995 Jensen et al.
5,515,107 A 5/1996 Chiang et al.
(Continued)

FOREIGN PATENT DOCUMENTS

AU 2010222898 9/2011
CA 2754760 9/2010
(Continued)

OTHER PUBLICATIONS

Canadian Intellectual Property Office, "Office Action", issued in connection with Canadian Patent Application No. 2,754,760, dated May 4, 2016, 5 pages.
(Continued)

*Primary Examiner* — Kaveh Abrishamkar
(74) *Attorney, Agent, or Firm* — Hanley, Flight & Zimmerman, LLC

(57) ABSTRACT

Systems and methods for payload encoding and decoding are disclosed. Example apparatus disclosed herein determine encoding data corresponding to one or more frequencies to be used to encode a message into audio data. Disclosed example apparatus also generate a license file including the encoding data, the license file corresponding to the message to be encoded into the audio data, the message to be encoded into the audio data by an encoding device. Disclosed example apparatus further transmit the license file to a decoding device to enable the decoding device to decode the message from the audio data based on the license file.

20 Claims, 5 Drawing Sheets

Related U.S. Application Data continuation of application No. 15/592,967, filed on May 11, 2017, now Pat. No. 10,095,843, which is a continuation of application No. 14/880,769, filed on Oct. 12, 2015, now Pat. No. 9,665,698, which is a continuation of application No. 12/400,481, filed on Mar. 9, 2009, now Pat. No. 9,160,988.

(51) Int. Cl.
| | |
|---|---|
| *H04N 21/8358* | (2011.01) |
| *H04N 21/81* | (2011.01) |
| *H04N 21/835* | (2011.01) |
| *H04N 7/24* | (2011.01) |

(52) U.S. Cl.
CPC ....... *H04N 21/8106* (2013.01); *H04N 21/835* (2013.01); *H04N 21/8358* (2013.01); *G06F 2221/0733* (2013.01)

(56) References Cited

U.S. PATENT DOCUMENTS

| | | | |
|---|---|---|---|
| 5,764,763 A | 6/1998 | Jensen et al. | |
| 6,598,162 B1 | 7/2003 | Moskowitz | |
| 6,792,280 B1* | 9/2004 | Hori | G06F 21/10 455/418 |
| 6,845,360 B2 | 1/2005 | Jensen et al. | |
| 6,871,180 B1 | 3/2005 | Neuhauser et al. | |
| 7,181,629 B1* | 2/2007 | Hatanaka | G06F 21/10 713/189 |
| 7,272,718 B1* | 9/2007 | Matsumura | G10L 19/018 380/217 |
| 7,978,859 B2 | 7/2011 | Conrado et al. | |
| 8,369,972 B2 | 2/2013 | Topchy et al. | |
| 8,457,951 B2 | 6/2013 | Srinivasan et al. | |
| 8,572,121 B2 | 10/2013 | Chastagnol et al. | |
| 9,160,988 B2* | 10/2015 | Lynch | H04N 7/24 |
| 9,665,698 B2* | 5/2017 | Lynch | H04N 21/835 |
| 10,095,843 B2 | 10/2018 | Lynch et al. | |
| 10,713,337 B2* | 7/2020 | Lynch | G06F 21/10 |
| 2002/0049930 A1 | 4/2002 | Hannigan | |
| 2003/0014436 A1* | 1/2003 | Spencer | G06Q 30/06 715/201 |
| 2003/0055656 A1 | 3/2003 | Tasaki | |
| 2003/0149879 A1 | 8/2003 | Tian et al. | |
| 2004/0059581 A1 | 3/2004 | Kirovski et al. | |
| 2005/0262351 A1 | 11/2005 | Levy | |
| 2006/0136718 A1* | 6/2006 | Moreillon | H04N 21/472 713/155 |
| 2006/0161777 A1 | 7/2006 | Kalker et al. | |
| 2006/0212710 A1* | 9/2006 | Baum | G06T 1/0028 713/176 |
| 2007/0098158 A1* | 5/2007 | Tapson | G06F 21/10 380/37 |
| 2007/0189525 A1 | 8/2007 | Wajs | |
| 2007/0300066 A1 | 12/2007 | Srinivasan | |
| 2008/0002882 A1* | 1/2008 | Voloshynovskyy | G07D 7/005 382/181 |
| 2008/0063196 A1 | 3/2008 | Evans et al. | |
| 2008/0114686 A1* | 5/2008 | Jogand-Coulomb | G06F 21/10 705/51 |
| 2009/0144561 A1* | 6/2009 | Davidson | G06F 21/50 713/190 |
| 2019/0012438 A1 | 1/2019 | Lynch et al. | |

FOREIGN PATENT DOCUMENTS

| | | |
|---|---|---|
| EP | 2406906 | 1/2012 |
| WO | 2005006326 | 1/2005 |
| WO | 2010104810 | 9/2010 |

OTHER PUBLICATIONS

European Patent Office, "Examination Report", issued in connection with European Patent Application No. 10751256.8, dated Jul. 19, 2016, 6 pages.

European Patent Office, "Extended European Search Report," issued in connection with Application No. 10751256.8, dated Jul. 4, 2012, 5 pages.

International Searching Authority, "Written Opinion," issued in connection with Application No. PCT/US10/26589, dated Apr. 23, 2010, 5 pages.

International Searching Authority, "International Search Report," issued in connection with Application No. PCT/ US10/26589, dated Apr. 23, 2010, 2 pages.

International Searching Authority, "International Preliminary Repod on Patentability," issued in connection with Application No. PCT/ US10/26589, dated Sep. 13, 2011, 6 pages.

IP Australia, "Patent Examination Report No. 1," issued in connection with Application No. 2010222898, dated Apr. 4, 2014, 4 pages.

Collberg et al., "A Taxonomy of Obfuscating Transformations," Technical Report, Department of Computer Science, University of Auckland, No. 148 (Jul. 1997), 36 pages.

Collberg et al., "Watermarking, Tamper-Proofing, and Obfuscation— Tools for Software Protection," University of Arizona Computer Science Technical Report, (Feb. 10, 2000), 17 pages.

Sosonkin et al., "Obfuscation of Design Intent in Object-Oriented Applications," Department of Computer and Information Science, Polytechnic University (Oct. 27, 2003), 16 pages.

Arbitron. "Critical Band Encoding Technology Audio Encoding System From Arbitron." Technical Overview, Revision D, (Jan. 2004), 27 pages.

IP Australia, "Notice of Acceptance," issued in connection with Application No. 2010222898, Aug. 10, 2015, 2 pages.

United States Patent and Trademark Office, "Final Office Action," issued in connection with U.S. Appl. No. 12/400,481, dated Dec. 31, 2014, 13 pages.

United States Patent and Trademark Office, "Non-Final Office Action," issued in connection with U.S. Appl. No. 12/400,481, dated Jul. 10, 2014, 13 pages.

United States Patent and Trademark Office, "Final Office Action," issued in connection with U.S. Appl. No. 12/400,481, dated Jun. 14, 2012, 13 pages.

United States Patent and Trademark Office, "Non-Final Office Action," issued in connection with U.S. Appl. No. 12/400,481, dated Dec. 12, 2011, 13 pages.

United States Patent and Trademark Office, "Notice of Allowance," issued in connection with U.S. Appl. No. 12/400,481, dated Jun. 3, 2015, 8 pages.

United States Patent and Trademark Office, "Advisory Action," issued in connection with U.S. Appl. No. 12/400,481, dated Sep. 21, 2012, 3 pages.

United States Patent and Trademark Office, "Non-Final Office Action," issued in connection with U.S. Appl. No. 14/880,769, dated Sep. 23, 2016, 6 pages.

United States Patent and Trademark Office, "Notice of Allowance," issued in connection with U.S. Appl. No. 14/880,769, dated Jan. 26, 2017, 5 pages.

European Patent Office, "Intention to Grant," issued in connection with application No. 10751256.8, dated Sep. 28, 2018, 40 pages.

Canadian Intellectual Property Office, "Office Action," issued in connection with application No. 2754760, dated Feb. 14, 2018, 3 pages.

United States Patent and Trademark Office, "Non-Final Office Action," issued in connection with U.S. Appl. No. 15/592,967, dated Sep. 27, 2017, 19 pages.

United States Patent and Trademark Office, "Final Office Action," issued in connection with U.S. Appl. No. 15/592,967, dated Mar. 1, 2018, 6 pages.

United States Patent and Trademark Office, "Notice of Allowance," issued in connection with U.S. Appl. No. 15/592,967, dated Jun. 5, 2018, 5 pages.

European Patent Office, "Intention to Grant," issued in connection with application No. 10751256.8, dated Feb. 11, 2019, 40 pages.

(56) References Cited

OTHER PUBLICATIONS

Canadian Intellectual Property Office, "Notice of Allowance," issued in connection with application No. 2754760, dated Jan. 17, 2019, 1 page.
European Patent Office, "Extended European Search Report," issued in connection with Application No. 19182174.3, dated Dec. 2, 2019, 9 pages.
United States Patent and Trademark Office, "Non-Final Office Action," issued in connection with U.S. Appl. No. 16/133,421, dated Nov. 15, 2019, 6 pages.
United States Patent and Trademark Office, "Notice of Allowance," issued in connection with U.S. Appl. No. 16/133,421, dated Mar. 10, 2020, 5 pages.
Canadian Intellectual Property Office, "Examination Report," issued in connection with Application No. 3,049,534, dated Oct. 6, 2020, 4 pages.
European Patent Office, "Examination Report," issued in connection with Application No. 19182174.3, dated Apr. 15, 2021, 5 pages.
Canadian Intellectual Property Office, "Examination Report," issued in connection with Application No. 3,049,534, dated Jun. 21, 2021, 4 pages.

\* cited by examiner

| INFORMATION SIGNAL | SYMBOL |
|---|---|
| COPYRIGHTED WORK | $S_1$ |
| AUTHOR | $S_2$ |
| BROADCASTING STATION | $S_3$ |
| DATE | $S_4$ |

FIG. 2

SYSTEMS AND METHODS FOR PAYLOAD ENCODING AND DECODING

RELATED APPLICATIONS

This patent arises from a continuation of U.S. patent application Ser. No. 16/133,421 filed on Sep. 17, 2018, titled "SYSTEMS AND METHODS FOR PAYLOAD ENCODING AND DECODING," which is a continuation of U.S. patent application Ser. No. 15/592,967, filed on May 11, 2017, titled "SYSTEMS AND METHODS FOR PAYLOAD ENCODING AND DECODING," which is a continuation of U.S. patent application Ser. No. 14/880,769, filed on Oct. 12, 2015, titled "SYSTEMS AND METHODS FOR PAYLOAD ENCODING AND DECODING," which is a continuation of U.S. patent application Ser. No. 12/400,481, filed Mar. 9, 2009, titled "SYSTEM AND METHOD FOR PAYLOAD ENCODING AND DECODING." Priority to U.S. patent application Ser. No. 16/133,421, U.S. patent application Ser. No. 15/592,967, U.S. patent application Ser. No. 14/880,769, and U.S. patent application Ser. No. 12/400,481 is claimed. U.S. patent application Ser. No. 16/133,421, U.S. patent application Ser. No. 15/592,967, U.S. patent application Ser. No. 14/880,769, and U.S. patent application Ser. No. 12/400,481 are incorporated herein by reference in their respective entireties.

TECHNICAL FIELD

The present disclosure relates to systems and processes for protecting encoded data, and, more specifically, to protecting media data that includes coding that provides media and/or market research.

BACKGROUND INFORMATION

Techniques such as "watermarking" have been known in the art for incorporating information signals into media signals or executable code. Typical watermarks may include encoded indications of authorship, content, lineage, existence of copyright, or the like. Alternatively, other information may be incorporated into audio signals, either concerning the signal itself, or unrelated to it. The information may be incorporated in an audio signal for various purposes, such as identification or as an address or command, whether or not related to the signal itself.

There is considerable interest in encoding audio signals with information to produce encoded audio signals having substantially the same perceptible characteristics as the original unencoded audio signals. Recent successful techniques exploit the psychoacoustic masking effect of the human auditory system whereby certain sounds are humanly imperceptible when received along with other sounds.

One particularly successful utilization of the psychoacoustic masking effect is described in U.S. Pat. Nos. 5,450,490 and 5,764,763 (Jensen et al.) in which information is represented by a multiple-frequency code signal which is incorporated into an audio signal based upon the masking ability of the audio signal. Additional examples include U.S. Pat. No. 6,871,180 (Neuhauser et al.) and U.S. Pat. No. 6,845,360 (Jensen et al.), where numerous messages represented by multiple frequency code signals are incorporated to produce and encoded audio signal. Each of the above-mentioned patents is incorporated by reference in its entirety herein. The encoded audio signal is suitable for broadcast transmission and reception as well as for recording and reproduction. When received, the audio signal is then processed to detect the presence of the multiple-frequency code signal. Sometimes, only a portion of the multiple-frequency code signal, e.g., a number of single frequency code components, inserted into the original audio signal, is detected in the received audio signal. However, if a sufficient quantity of code components is detected, the information signal itself may be recovered.

While media data encoding and watermarking has been known in the art, there continues to be great interest in additionally protecting the media data from "hackers" or "pirates." One well-known technique for protecting data is encryption, which transforms information using a cipher algorithm to make it unreadable to anyone except those possessing a key. Another related technique for protecting data is referred to as "obfuscation," where input data is encoded before it is sent to a hash function or other encryption scheme. One of the advantages of obfuscation is that it helps to make brute force attacks unfeasible, as it is difficult to determine the correct cleartext for decryption. Examples of obfuscation techniques may be found in Collberg et al., "A Taxonomy of Obfuscating Transformations," Technical Report, Department of Computer Science, University of Auckland, No. 148 (July 1997), Collberg, Thomborson, "Watermarking, Tamper-Proofing, and Obfuscation—Tools for Software Protection," University of Arizona Computer Science Technical Report, (Feb. 10, 200), and Sosonkin et al., "Obfuscation of Design Intent in Object-Oriented Applications," Department of Computer and Information Science, Polytechnic University (2003), each of which is incorporated by reference in its entirety herein.

While the aforementioned techniques of encryption and obfuscation has served to protect data files themselves, there has been insufficient work in area of protecting media measurement data, as well as data encoded using psychoacoustic masking. Under the systems and methods described below, key components of numeric and/or pattern-based algorithms may be eliminated from software applications intended for untrusted computing environments. The disclosed configuration provides a high level of protection against reverse engineering because the software does not contain the actual software code implementation of the algorithm, but only the numeric results of the algorithm. Accordingly, attempts at reverse engineering the code would not yield the actual algorithm. This technique can be extended to include protection of higher-level functionality using a set of stored patterns, representing the required algorithm flow, executed by a generic pattern engine. Because the stored patterns are not part of the actual software code, they can not be disassembled. By using a generic pattern engine, reverse engineering may be frustrated further.

SUMMARY

For this application the following terms and definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The terms "media data" and "media" as used herein mean data which is widely accessible, whether over-the-air, or via cable, satellite, network, internetwork (including the Internet), print, displayed, distributed on storage media, or by any other means or technique that is humanly perceptible, without regard to the form or content of such data, and including but not limited to audio, video, text, images, animations, databases, datasets, files, broadcasts, displays (including but not limited to video displays, posters and billboards), signs, signals, web pages and streaming media data.

The term "database" as used herein means an organized body of related data, regardless of the manner in which the data or the organized body thereof is represented. For example, the organized body of related data may be in the form of a table, a map, a grid, a packet, a datagram, a file, a document, a list or in any other form.

The terms "coupled", "coupled to", and "coupled with" as used herein each mean a relationship between or among two or more devices, apparatus, files, circuits, elements, functions, operations, processes, programs, media, components, networks, systems, subsystems, and/or means, constituting any one or more of (a) a connection, whether direct or through one or more other devices, apparatus, files, circuits, elements, functions, operations, processes, programs, media, components, networks, systems, subsystems, or means, (b) a communications relationship, whether direct or through one or more other devices, apparatus, files, circuits, elements, functions, operations, processes, programs, media, components, networks, systems, subsystems, or means, and/or (c) a functional relationship in which the operation of any one or more devices, apparatus, files, circuits, elements, functions, operations, processes, programs, media, components, networks, systems, subsystems, or means depends, in whole or in part, on the operation of any one or more others thereof.

The terms "communicate," "communicating" and "communication" as used herein include both conveying data from a source to a destination, and delivering data to a communications medium, system, channel, device or link to be conveyed to a destination.

The term "processor" as used herein means processing devices, apparatus, programs, circuits, components, systems and subsystems, whether implemented in hardware, software or both, whether or not programmable and regardless of the form of data processed, and whether or not programmable. The term "processor" as used herein includes, but is not limited to, computers, hardwired circuits, signal modifying devices and systems, devices and machines for controlling systems, central processing units, programmable devices, state machines, virtual machines and combinations of any of the foregoing.

The terms "storage" and "data storage" as used herein mean data storage devices, apparatus, programs, circuits, components, systems, subsystems and storage media serving to retain data, whether on a temporary or permanent basis, and to provide such retained data.

In accordance with various examples, systems, methods and apparatuses are disclosed for protecting media data encoding and decoding. Preferably, a minimum set of information needed to encode a single message for an encoded audio signal is loaded separately from the media data into an encoder. A media license file is generated to protect the encoded data, where the underlying information relevant to the media data may be hidden through encryption in order to foster security. The algorithm(s) for encoding may be provided using a shared library, combined with an encoding payload that provides the minimum information set required to form the single message. The combination is then encrypted and sent over a network to a remote encoder factory application that instantiates encoding channels after unpacking the combination.

For decoding, a partial decoder may be utilized to apply pattern matching information in the encoded payload. The matching is preferably performed in a decoder algorithm in order to confirm that the encoding is actually present and is proper. Accordingly, the payload must be successfully decoded and verified before the underlying data may be decoded, due to the partial symbol/bin information.

Other objects, features, and advantages according to the present disclosure will become apparent from the following detailed description of certain advantageous examples when read in conjunction with the accompanying drawings in which the same components are identified by the same reference numerals.

BRIEF DESCRIPTION OF THE DRAWINGS

FIG. 2 is a table illustrating an exemplary methodology for encoding information in an audio signal;

DETAILED DESCRIPTION

Figure 1:
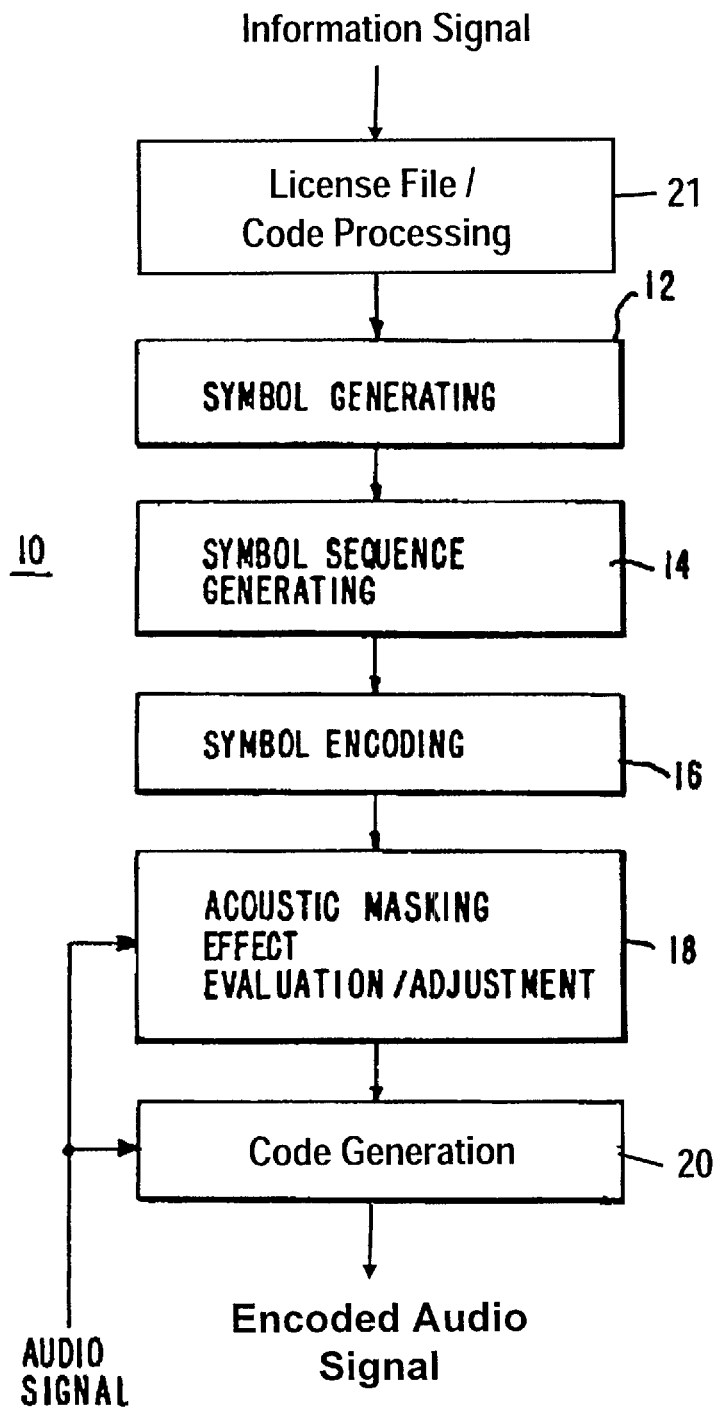
FIG. 1 is an exemplary block diagram illustrating a an encoding apparatus for generating a protected signal.

FIG. 1 is a functional block diagram of an exemplary audio signal encoder 10. Encoder 10 implements an optional symbol generation function 12, a symbol sequence generation function 14, a symbol encoding function 16, an acoustic masking effect evaluation/adjustment function 18, an audio signal inclusion function 20, and a license file/code processing function 21. Preferably, encoder 10 comprises a software-controlled computer system. The computer may be provided with an analog processor for sampling an analog audio signal to be encoded, or may input the audio signal directly in digital form, with or without resampling. Alternatively, encoder 10 may comprise one or more discrete signal processing components.

The symbol generation function 12, when employed, translates an information signal into a set of code symbols. This function may be carried out with the use of a memory device, such as a semiconductor EPROM of the computer system, which is prestored with a table of code symbols suitable for indexing with respect to an information signal. An example of a table for translating an information signal into a code symbol for certain applications is shown in FIG. 2. The table may be stored on a hard drive or other suitable storage device of the computer system. The symbol generation function may also be carried out by one or more discrete components, such as an EPROM and associated control devices, by a logic array, by an application specific integrated circuit, or any other suitable device or combination of devices. The symbol generation function may also be implemented by one or more devices which also implement one or more of the remaining functions illustrated in FIG. 1.

The symbol sequence generating function 14 formats the symbols produced by the symbol generating function (or input directly to the encoder 10) into a redundant sequence of code or information symbols. As part of the formatting process, in some examples marker and/or synchronization symbols are added to the sequence of code symbols. Preferably, the generating function 14 is implemented in a processing device, such as a microprocessor system, or by a dedicated formatting device, such as an application specific integrated circuit or a logic array, by a plurality of components or a combination of the foregoing. The symbol sequence generating function may also be implemented by one or more devices which also implement one or more of the remaining functions illustrated in FIG. 1.

As noted above, the symbol sequence generating function 14 is optional. For example, the encoding process may be carried out such that the information signal is translated directly into a predetermined symbol sequence, without implementing separate symbol generating and symbol sequence generating functions.

Figure 4:
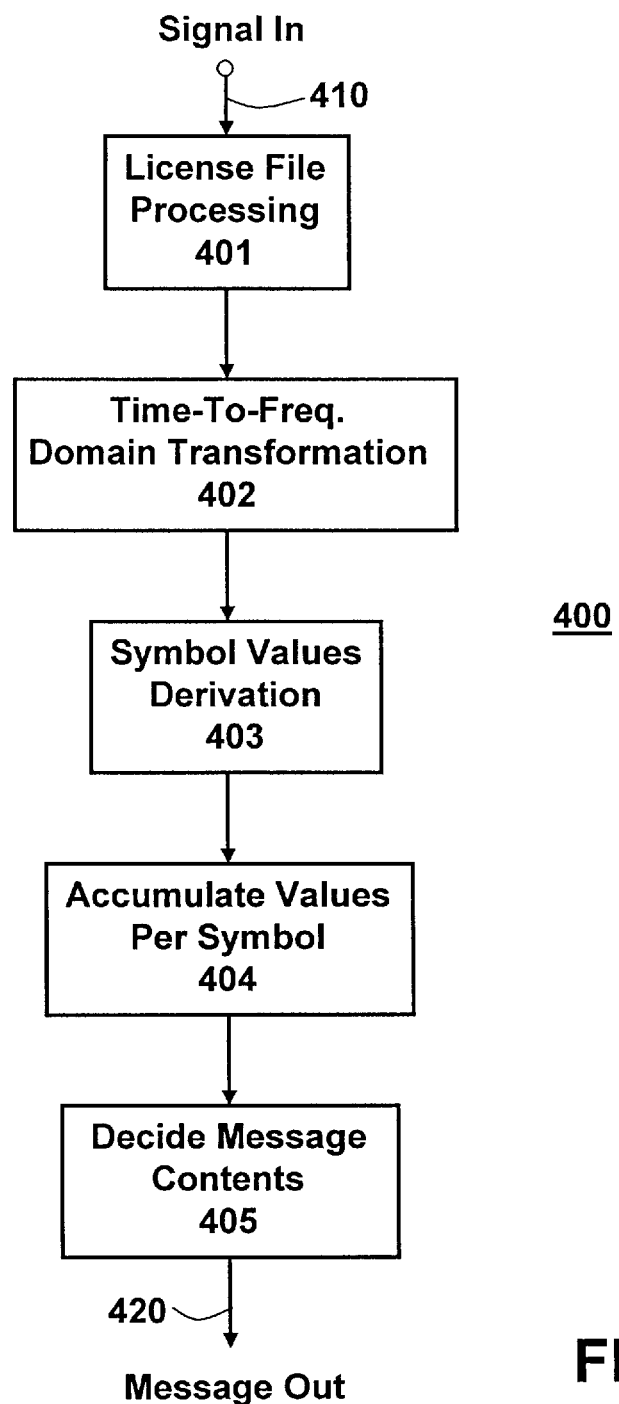
FIG. 4 is a functional block diagram illustrating an exemplary decoding apparatus for decoding a protected signal.

Each symbol of the sequence of symbols thus produced is preferably converted by the symbol encoding function 16 into a plurality of single-frequency code signals. In some advantageous examples, the symbol encoding function is performed by means of a memory device of the computer system, such as a semiconductor EPROM, which is pre-stored with sets of single-frequency code signals that correspond to each symbol. An example of a table of symbols and corresponding sets of single-frequency code signals is shown in FIG. 4.

Alternatively, the sets of code signals may be stored on a hard drive or other suitable storage device of the computer system. The encoding function may also be implemented by one or more discrete components, such as an EPROM and associated control devices, by a logic array, by an application specific integrated circuit or any other suitable device or combination of devices. The encoding function may also be carried out by one or more devices which also implement one or more of the remaining functions illustrated in FIG. 1.

In the alternative, the encoded sequence may be generated directly from the information signal, without implementing the separate functions 12, 14, and 16.

The acoustic masking effect evaluation/adjustment function 18 determines the capacity of an input audio signal to mask single-frequency code signals produced by the symbol encoding function 16. Based upon a determination of the masking ability of the audio signal, the function 18 generates adjustment parameters to adjust the relative magnitudes of the single-frequency code signals so that such code signals will be rendered inaudible by a human listener when incorporated into the audio signal. Where the audio signal is determined to have low masking capacity, due to low signal amplitude or other signal characteristics, the adjustment parameters may reduce the magnitudes of certain code signals to extremely-low levels or may nullify such signals entirely. Conversely, where the audio signal is determined to have a greater masking capacity, such capacity may be utilized through the generation of adjustment parameters that increase the magnitudes of particular code signals. Code signals having increased magnitudes are generally more likely to be distinguishable from noise and thus detectable by a decoding device. Further details of some advantageous examples of such evaluation/adjustment function are set forth in U.S. Pat. Nos. 5,764,763 and 5,450,490 to Jensen, et al., each entitled Apparatus and Methods for Including Codes in Audio Signals and Decoding, which are incorporated herein by reference in their entirety.

In some examples, the function 18 applies the adjustment parameters to the single-frequency code signals to produce adjusted single-frequency code signals. The adjusted code signals are included in the audio signal by the function 20. Alternatively, the function 18 supplies the adjustment parameters along with the single-frequency code signals for adjustment and inclusion in the audio signal by the function 20. In still other examples, the function 18 is combined with one or more of the functions 12, 14, and 16 to produce magnitude-adjusted single-frequency code signals directly.

In some examples, the acoustic masking effect evaluation/adjustment function 18 is implemented in a processing device, such as a microprocessor system which may also implement one or more of the additional functions illustrated in FIG. 1. The function 18 may also be carried out by a dedicated device, such as an application specific integrated circuit or a logic array, or by a plurality of discrete components, or a combination of the foregoing.

The code inclusion function 20 combines the single-frequency code components with the audio signal to produce an encoded audio signal. In a straightforward implementation, the function 20 simply adds the single-frequency code signals directly to the audio signal. However, the function 20 may overlay the code signals upon the audio signal. Alternatively, modulator 20 may modify the amplitudes of frequencies within the audio signal according to an input from acoustic masking effect evaluation function 18 to produce an encoded audio signal that includes the adjusted code signals. Moreover, the code inclusion function may be carried out either in the time domain or in the frequency domain. The code inclusion function 20 may be implemented by means of an adding circuit, or by means of a processor. This function may also be implemented by one or more devices described above which also implement one or more of the remaining functions illustrated in FIG. 1.

FIG. 2 illustrates an exemplary translation table for converting an information signal into a code symbol. As shown, an information signal may comprise information regarding the content of, the characteristics of, or other considerations relating to a particular audio signal. For example, it is contemplated that an audio signal could be modified to include an inaudible indication that copyright is claimed in the audio program. Correspondingly, a symbol, such as $S_1$, may be utilized to indicate that copyright is claimed in the particular work. Similarly, an author may be identified with a unique symbol $S_2$ or a broadcasting station identified with a unique symbol $S_3$. Further, a particular date could be represented by a symbol $S_4$. Of course many other types of information could be included in an information signal and translated into a symbol. For example, information such as addresses, commands, encryption keys, etc., may be encoded in such symbols. Alternatively, sets or sequences of symbols, in addition to or instead of individual symbols, may be utilized to represent particular types of information. As another alternative, an entire symbolic language may be implemented to represent any type of information signal. Also, the encoded information need not be related to the audio signal.

Referring back to FIG. 1, one or more of the functions 12 through 20 may be implemented by a single device. In some advantageous examples, the functions 12, 14, 16 and 18 are implemented by a single processor, and in still others a single processor carries out all of the functions illustrated in FIG. 1. Moreover, two or more of the functions 12, 14, 16 and 18 may be implemented by means of a single table maintained in an appropriate storage device.

The license file/code processing function 21 of FIG. 1 implements secure encoding of media streams in such a way to protect the media stream and allow it to be integrated with third-party tools capable of extracting and restoring the data (e.g., audio from video format files). License file 21 (also referred to as a "Media License File") serves in the example as a container for encoding information in an encoded payload, where the encoded payload includes only enough information to allow a pattern based encoder to generate one code.

Typically, the encoder 10 may be configured to allow the resultant encoding to be verified as proper, or authorized for use. For audio data, the encoder 10 may have complete symbol/bin information embedded or hard-coded for each layer. Preferably however, the encoder 10 may use pattern matching to avoid having complete symbol/bin information. In the case where partial symbol/bin information is generated, the underlying audio data is better suited for protection from unauthorized users. Using the configurations detailed below, encoding may be subsequently verified as part of a file encoding service without having complete symbol/bin information.

Under one example, a minimum set of information needed to encode a single message for an encoded audio signal is loaded separately from the media data into the encoder 10. The message should preferably not be hard-coded into the source. When generating a Media License File 21, the underlying information relevant to the media data may be hidden through encryption in order to foster security, and to advantageously "future-proof" the encoding algorithm against layer and message structure changes.

Referring to the example, the encoding algorithm may be provided using a shared library, combined with an encoding payload that provides the minimum information set required to form the single message. The combination is then encrypted and sent over a network to a remote encoder factory application that instantiates encoding channels after unpacking the combination. The unpacking can be to a RAMDISK making it volatile. Under this configuration, the encoding algorithms and payload do not have to reside permanently on the encoding machine, for improved security. Furthermore, the shared library/payload configuration advantageously allows changes to the encoding algorithm to be distributed to all potentially affected machines.

On the decoding side, a partial decoder is utilized to apply pattern matching information in the encoded payload. The matching is preferably performed in a modified decoder algorithm (such as the one described in U.S. Pat. No. 6,871,180, cited above) in order to confirm that the encoding is actually present and is proper. Accordingly, the payload must be successfully decoded and verified before the underlying data may be decoded, due to the partial symbol/bin information. Additional details on the decoding may be found below in connection with FIG. 4

Figure 3:
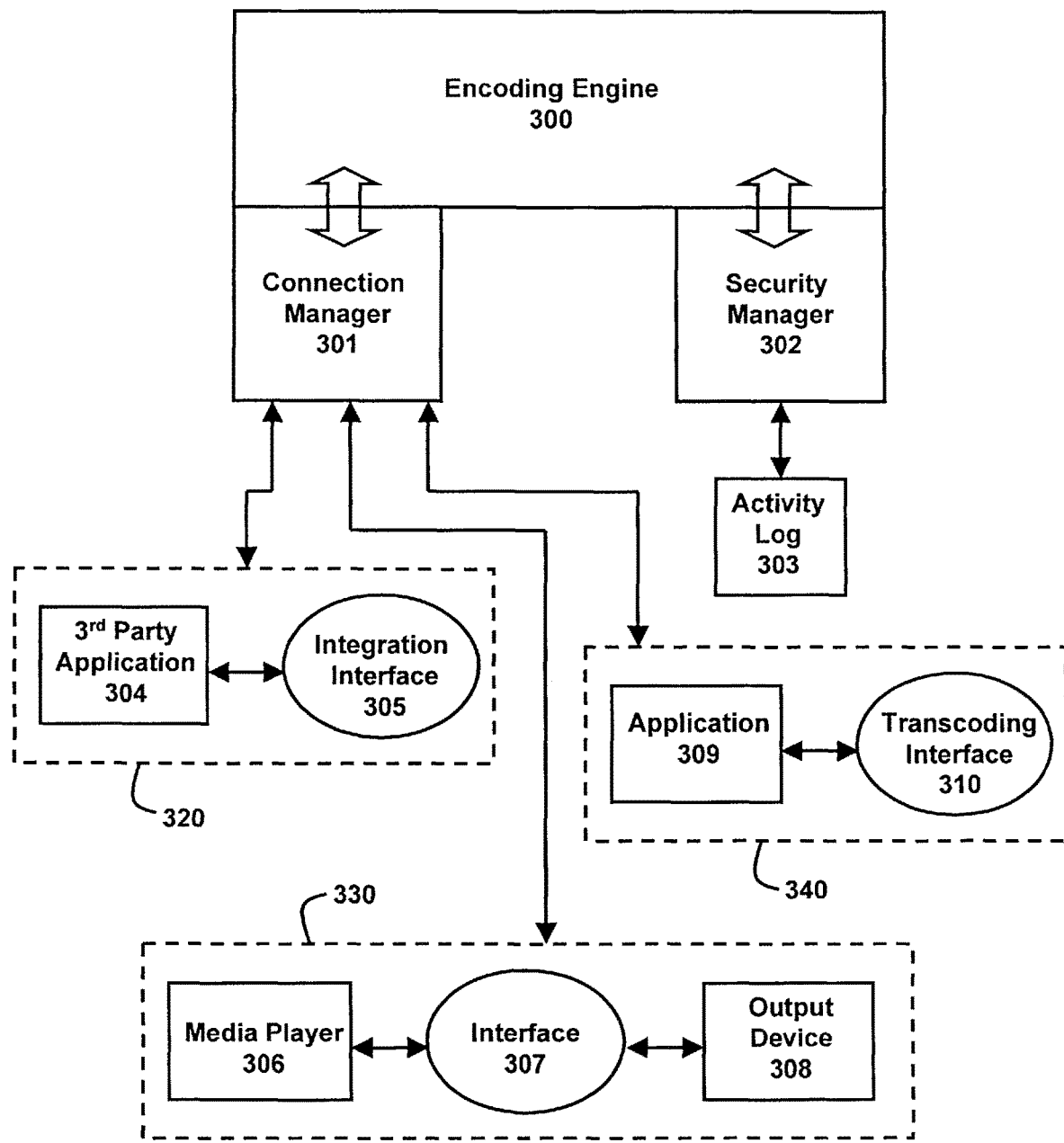
FIG. 3 is a system diagram illustrating components used for creating a protected signal.

Turning now to FIG. 3, an exemplary media file encoding system is disclosed. Primary components of the system include the encoding engine 300, connection manager 301, and the security manager 301. Support components of the system include integration interface 305, media/audio interface 307, and transcoding interface 310. The media file encoding system illustrated in the example of FIG. 3 is particularly configured for transmitting/broadcasting media data, such as audio data, to multiple locations via connection manager 301, where the media data is encoded to allow authorized $3^{rd}$ parties to monitor audience data exposure and/or usage. Accordingly, using the techniques disclosed herein, if protected data fails to be authenticated via the encoded payload/Media License File, the interface components will simply transmit unencoded media/audio data. In other words, the system will appear to be functional to the audience, but the unencoded audio will not permit $3^{rd}$ parties to monitor audience activities.

The connection manager 301 is primarily responsible for interfacing with remote locations. In some examples, connection manager 301 may use network-based communications, sockets, or higher-level web services. Typically, the connection manager 301 will wait for and accept connections from the interface components (305, 307, 310), where multiple simultaneous connections are supported. It then handles the information flow between the interface and the encoding engine 300. The connection manager is configured to format media/audio data stream for encoding, and also handle configuration and control for the encoding process. The connection manager 301 preferably runs in the system background as an operating system (OS) service as a long-running executable that performs specific functions with or without user intervention. The service may be configured to start when the system is booted and run in the background as long as the OS is running, or can be started manually when required. As an example, connection manager 301 may be run as a Windows™ service or a Linux daemon to performing the disclosed functions.

The encoding engine 300 of FIG. 3 is configured in the example to provide encoding (e.g., digital watermark) to the input media/audio data. Encoding engine 300 receives packets of data from the connection manager 301, adds a digital watermark, and sends encoded packets back to the connection manager 301 (illustrated as bi-directional arrow in FIG. 3). The encoding engine 300 also generates encoding that is equivalent to hardware encoders (i.e. such as that provided in Arbitron's® Digital/SDI Encoders). The configuration and control information, received from the external interfaces (305, 307, 310) and validated by the connection manager 301, is processed within the encoding engine 300. This information includes, among other possible information, audio sample rate, sample size, packet size, and the encoded message definition. Thus, the encoding engine 300 may operate as a thread or process, under the control of the connection manager 301. Multiple instances of the encoding engine 300 may be invoked by the connection manager 301. The connection manager 301 should be configured to support both local and remote hosting. Using network sockets, the encoding application can run locally on a client's computer or remotely on a workstation. For a fully Internet capable application, web service technology can be used to implement the communications interface between the components The security manager 302 communicates with the encoding engine 300 and is responsible for ensuring that the use of the encoding engine 300 is authorized. Security manager 302 may also be configured to support time-limiting use of the encoding engine. Furthermore, security manager 302 may also be configured for activity logging. Each time the encoding application is activated in encoding engine 300, information about the session would be stored in an activity log 303. The information logged would typically include date, time, operator, and any information about the media content that is available from the appropriate interface. In installations where an Internet connection to the target machine is available, the activity log could be remotely accessed.

Continuing with the illustration shown in FIG. 3, various interfaces may be provided for communication with connection manager 301. One such interface, integration interface 305, provides connectivity to 3rd party application software 304 such that the encoding process can be integrated into the workflow of media/audio production houses to include such features as transcoding and non-linear editing systems. In a preferred example, the integration interface 305 would be additionally developed for each $3^{rd}$ party application. As shown in FIG. 3, the integration interface 305 is communicably coupled to $3^{rd}$ party application 304 and to connection manager 301. In the preferred example, integration interface 305 would be integrated and distributed together with the $3^{rd}$ party application 304 as a Windows DLL or Linux shared library, although other arrangements are possible.

Media/audio interface 307 is preferably configured as an application that operates between a media player 306 and output device 308. Interface 307 is configured to intercept digital audio at the point of playback (e.g., home computer) and forward it to connection manager 301. The subsequently encoded audio is then sent back the media/audio interface 307 and ultimately to the sound output device 308. Since the interface 307 intercepts the audio as it is played back, the format and contents of the media file does not become a factor. In other words, transcoding and/or manipulation of the original file is not necessary, and the only requirement is that a standard audio output device (as seen by the host operating system) be targeted by the client's media player application 306.

For applications where 3rd party transcoding software is cost prohibitive and/or unavailable, a format-limited transcoding interface 310 may be provided for support. Supported media file formats include AVI, QuickTime, and WAV, among others. In addition to the transcoding interface 310, a user interface application 309 is provided to control the overall process. During operation, the transcoding interface 310 would accept a media file in a supported format, extract the audio portion for encoding, and then integrate the encoded audio back into the final output file. To ease processing requirements, format conversion would not be supported under a preferred example. Thus, the interface would not be required to perform a generic transcoding application, but serve a secondary capability leveraging technology that is incorporated as part of Sun Microsystem's Java Media Framework and/or Microsoft's DirectX.

Native code (e.g., C/C++) is preferably used to handle interface components and signal processing elements that are computationally intensive. Commercially available math libraries (e.g., Intel® MKL) may be also used to support multi-threaded operation and is optimized for use on Intel processors. Also, in order to support the broadest range of host computers and application areas, the software should preferably be developed in Java. This would also allow use of the Java Media Framework (JMF) that provides cross-platform support for the audio interface and the transcoding interface. However, because Java is a managed language, that typically operates within a virtual machine environment, additional security measures will be required in this case.

Accordingly, the encoded Media License File 21 described in connection with FIG. 1 and utilized in the system of FIG. 3 may serve to protect the underlying data. The license file is used to authorize use of the application, and contains an encryption key embedded in it to unlock the encoding engine and the Ethernet address of the target computer. The Ethernet address is used to uniquely tie the application to the target computer. Thus, the encoding application would not function unless the address of the machine matches that in the file. Under a preferred example, the license file contains the numeric tables needed to generate the encoded message, rather than the message information itself. This provides two levels of protection: (1) The dynamic message generation code, which contains core information, is not distributed as part of the application and (2) long sequences of floating-point numbers will not be of much use to hackers seeking to break into the code.

The message assignment for the license file may be static, where a client receives one or more license files, and each file can be applied to one or more media files as needed. In order to support multiple license files, the files should be uniquely named, by preferably using the date and time of generation. Also, the license file should be tailored to a client's Ethernet address (physical MAC address) of the target machine. After one or more license files are is generated, they may be transmitted to remote client locations. Multiple instances of the encoding engine can be active on a single target machine, and each instance can encode a different media file, using the same or different license files.

The message assignment for the license file may also use a dynamic code assignment, where a client can receive a new license file and message for each encoding session. For dynamic coding, an active Internet connection is required between the client utilizing the encoding system. Client and session information is sent to the operator of the encoding system, where the license file is created (typically on a server), and sent back to the client's application.

As mentioned above, the license file is encrypted to protect its contents. The encryption key should be a combination of a fixed key stored in the application and the target computer's Ethernet address (or other unique information). One method for protection against reverse engineering is the use of code obfuscation tools. Since the major components of the encoding application are to be written in Java, a Java byte-code obfuscator can be used to render files that, when de-compiled, reveal little, if any, of the original program flow and data structure. Code obfuscation techniques include control-flow remapping, variable renaming and redundancy (applying scope rules), and run-time string decryption.

Using control flow remapping, the logic and flow of the program for the license file may be re-expressed, making the translation into valid source code difficult, if not impossible. This technique relies on the fact developers typically write software in a structured manner to make it "human readable" and organized in some a manner that makes it easy to maintain. However, such constructs, while useful to developers, are of no use to a computer and the liberal use of jump instructions or obtuse instructions sequences makes no difference in the final execution of the code (akin to truly compiled languages like C or C++). But such measures do confuse de-compilers and result in de-compiled code that is much harder to understand.

Alternately, when using variable renaming, either alone or combined with the other techniques, makes reverse engineering extremely difficult. Computer languages have scope rules, or rules about when a variable of a given name is active. As such, developers tend to use descriptive names for variables and name variables with different functions different names. While descriptive names are useful to developers (and hackers), they are of no use to the computer. Thus, variable renaming exploits scope rules and creates many instances of variables (e.g., named "a" or "b" etc.). When such code is de-compiled, it creates confusion as to which variable is being accessed and when, without a detailed understanding of the scope rules. In addition, it makes it difficult to discern the purpose of variables because all of the descriptive names have been removed.

As another alternative and/or addition, string encryption/decryption may be used. Encryption and subsequent run-time decryption of textual information, or strings, can be important because string searches are the primary means by which hackers gain an understanding of the program flow. Typically, strings contained in the binary program file can yield clues as to the whereabouts of key program functionality. For example, a hacker looking for the code segments that deal with authorization can search for error messages such as "authorization failure" or "user not valid" in the program file. Since the hacker knows that the code segments dealing with authorization can, typically, be found in the vicinity of the error messages, his job has just been made easier. Further, by circumventing the program flow that leads to the error message being generated, the hacker can bypass the authorization process. If a hacker can't find any intelligible text messages, such attacks are significantly harder.

Other software options for protection against unauthorized use may include tying the application software to a unique identification code contained within the target computer, such as the hard drive serial number. Hardware and software combinations, such as security dongles, are a similar mechanism where the unique identification code is contained within the external dongle and the dongle is usually accessed using a cryptic instruction sequence. When application software reads the expected identification code from a license file or other protected repository (e.g., in cases where the unique ID is contained within the application itself), the software compares that code to the identification code of the computer. Typically, unique numbers such as the hard drive serial number or the Ethernet controller address are used. If the machine's identification code does not match the expected code, the application does not function.

In order to further improve the protection of encoded data, one or more portions of data related to the encoding may be omitted. One exemplary encoding technique is Critical Band Encoding Technology (CBET), developed by Arbitron, Inc. (for further information, see "Critical Band Encoding Technology Audio Encoding System From Arbitron," Technical Overview, January 2004 (Revision D), available at http://www.sbe15.com/literature/Arbitron_CBET_Whitepaper.pdf). Using the CBET example, certain portions of the CBET algorithm can be removed from the encoding engine component (see FIG. 3, 300). In the hardware encoders, the embedded software is configured to dynamically generate the numeric tables necessary to encode any given message. The hardware encoders also contain the complete frequency set for each defined layer (for prior encoding detection as well as the need to handle any defined message). The precompiled numeric tables, which would be contained in the license file, allows these core algorithms to be removed from the application software, leaving a hacker without useful information. Therefore, even in the event that the software is reverse engineered or compromised, the extent of the damage would be limited.

Other elements of encoding data that may be protected under the present disclosure includes:

Decoding Information: data defining the messages, symbols, and code tone frequencies needed to perform the decode algorithm;

Message Codes: data including the combination of ID, extension, and layer used to identify an encoding entity;

Decoding Algorithm: the process steps, using decoding information, used to determine if an audio stream has message codes embedded in it; and Diagnostic Information: a compressed representation of encoded material, spanning the layer set, used to validate the operation of the decoding shared library.

Turning to FIG. 4, the illustration shows an example decoding process. An audio signal which may be encoded, as described hereinabove with a plurality of code symbols and license file, and received at an input 410. The received audio signal may be a broadcast, internet or otherwise communicated signal, or a reproduced signal. It may be a direct coupled or an acoustically coupled signal. From the following description in connection with the accompanying drawings, it will be appreciated that the decoder 400 is capable of detecting codes in addition to those arranged in the formats disclosed hereinabove.

Upon receipt, license file processing feature 401 serves to process the security protocols described above. Under a preferred example, encryption/decryption keys are received at the decoding end prior to the receipt of the signal, where a volatile key is received using a secured link. The license file processing 401 then processes the license file (payload) to obtain access to one or more of decoding information, message codes, decoding algorithm and diagnostic information. Once processed, the decoder 400 would have enough information to decode the incoming signal.

For received audio signals in the time domain, the decoder 400 transforms such signals to the frequency domain by means of a function 402. The function 402 preferably is performed by a digital processor implementing a fast Fourier transform (FFT) although a direct cosine transform, a chirp transform or a Winograd transform algorithm (WFTA) may be employed in the alternative. Any other time-to-frequency-domain transformation function providing the necessary resolution may be employed in place of these. It will be appreciated that in certain implementations, the function 402 may also be carried out by analog or digital filters, by an application specific integrated circuit, or any other suitable device or combination of devices. The function 402 may also be implemented by one or more devices which also implement one or more of the remaining functions illustrated in FIG. 4.

The frequency domain-converted audio signals are processed in a symbol values derivation function 403, to produce a stream of symbol values for each code symbol included in the received audio signal. The produced symbol values may represent, for example, signal energy, power, sound pressure level, amplitude, etc., measured instantaneously or over a period of time, on an absolute or relative scale, and may be expressed as a single value or as multiple values. Where the symbols are encoded as groups of single frequency components each having a predetermined frequency, the symbol values preferably represent either single frequency component values or one or more values based on single frequency component values.

The function 403 may be carried out by a digital processor, such as a digital signal processor (DSP) which advantageously carries out some or all of the other functions of decoder 400. However, the function 403 may also be carried out by an application specific integrated circuit, or by any other suitable device or combination of devices, and may be implemented by apparatus apart from the means which implement the remaining functions of the decoder 400.

The stream of symbol values produced by the function 403 may be accumulated over time in an appropriate storage device on a symbol-by-symbol basis, as indicated by the function 404. In particular, the function 404 is advantageous for use in decoding encoded symbols which repeat periodically, by periodically accumulating symbol values for the various possible symbols. For example, if a given symbol is expected to recur every X seconds, the function 404 may serve to store a stream of symbol values for a period of nX seconds (n>1), and add to the stored values of one or more symbol value streams of nX seconds duration, so that peak symbol values accumulate over time, improving the signal-to-noise ratio of the stored values.

The function 404 may be carried out by a digital processor, such as a DSP, which advantageously carries out some or all of the other functions of decoder 400. However, the function 404 may also be carried out using a memory device separate from such a processor, or by an application specific integrated circuit, or by any other suitable device or combination of devices, and may be implemented by apparatus apart from the means which implements the remaining functions of the decoder 400.

The accumulated symbol values stored by the function 404 are then examined by the function 405 to detect the presence of an encoded message and output the detected message at an output 420. The function 405 can be carried out by matching the stored accumulated values or a processed version of such values, against stored patterns, whether by correlation or by another pattern matching technique. However, the function 405 advantageously is carried out by examining peak accumulated symbol values and their relative timing, to reconstruct their encoded message. This function may be carried out after the first stream of symbol values has been stored by the function 404 and/or after each subsequent stream has been added thereto, so that the message is detected once the signal-to-noise ratios of the stored, accumulated streams of symbol values reveal a valid message pattern.

Figure 5:
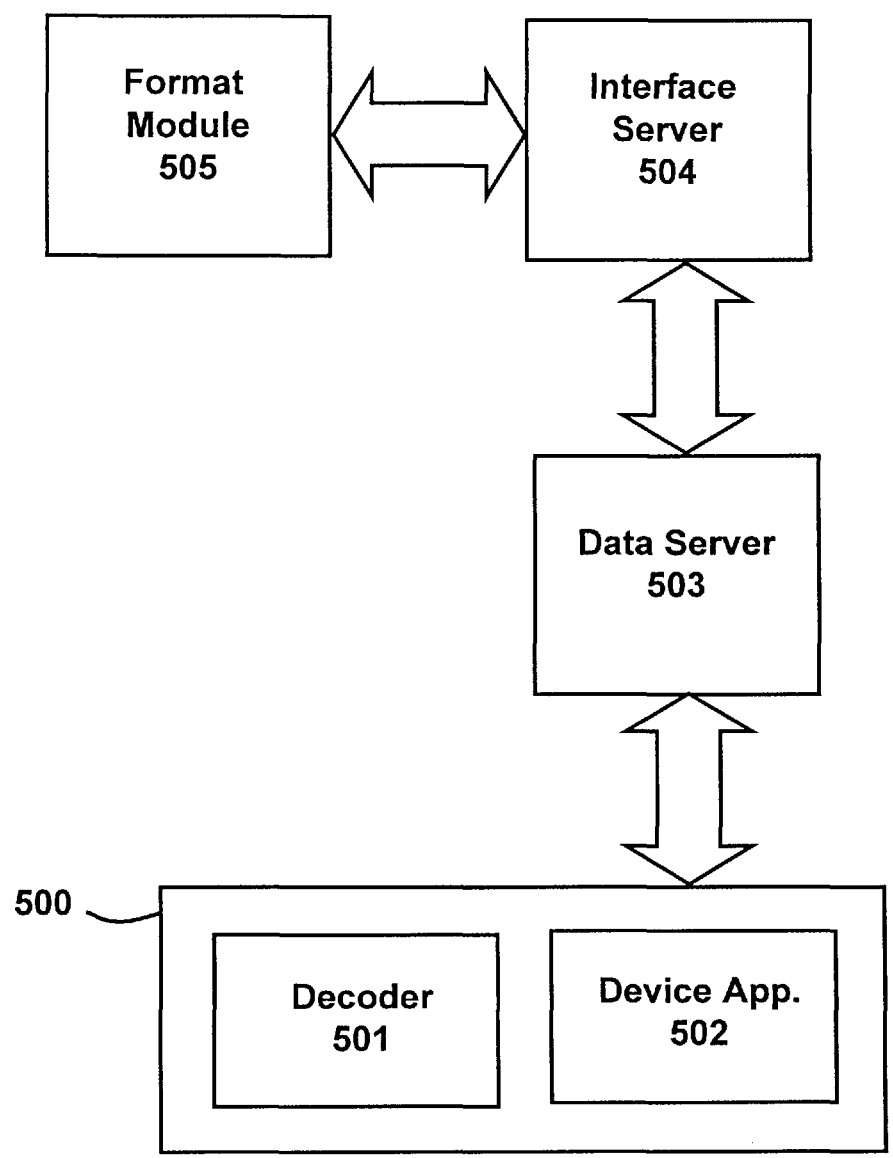
FIG. 5 is a functional block diagram illustrating an example of installation and execution of an encoding/decoding arrangement.

FIG. 5 is an exemplary overview of the system decoding operation under an example directed to audience-measurement. The system as illustrated in FIG. 5 comprises decoder panel 500, data server 503, interface server 504 and format module 505. Interface server 504 serves as a centralized processing device for managing the data interface for the data server 503 and format module 505. Data server 503 (which may alternately be combined with interface server 504) manages communications between decoder panel 500 and interface server 504. Typically, data such as decode payloads and software upgrades would be sent to data server 503 from interface server 504. Data server 503 would produce data such as detection reports, panel status and new install updates. Format module 505 converts information reported by the decoder panel 500, via data server 503, to a format that would be appropriate for respective applications, such as audience measurement and the like. Typically, detection reports and queries linking user/device data to detection reports would be received at the format module.

Decoder panel 500 may be one or a collection of devices having a decoder 501 and device application 502, where the panel 500 invokes decoder 501, preferably using device application 502. Application 502 then would operate further to configure the decoder 501 to (1) operate on the media/audio stream using decrypted copies of the hash key and decoding information, (2) operate on a microphone input stream using decrypted copies of the hash key and decoding information, (3) media/audio stream sample feeds, (4) periodically poll the decoder for detection of encoded (CBET) media/audio data, (5) report the encoded (CBET) detection data, along with user and device identification information, and status information to the data server 503, and/or (6) perform diagnostics on the decoder.

As mentioned above, the decode payload associated with the license file may include a hash key linked to an algorithm internal to the decoder, and may be used to unlock the decoder to permit operation. The decode payload also may include an encrypted decoding information byte array that defines the layers, message structures, and symbol durations for decoding. Furthermore, the decode payload may include an encrypted diagnostic data byte array that can be used as a source for verifying the decoding operation. These elements are preferably combined into a file package to be unpacked and incorporated into an encrypted rule set.

In an exemplary process flow overview of the operation of the systems of FIG. 5 and FIG. 3, a panelist (i.e., the decoding end of the system) would receive and install the necessary application(s), along with a decoder (e.g., CBET), under a software-based example. The panelist's ID information and other relevant information would be provided to data server 503, which in turn would obtain Dynamic Code Package (DCP) information from interface server 504. The DCP information may contain license information, decryption keys and diagnostic information that is incorporated in the DCP. If the DCP request is accepted by interface server 504, the server generates a DCP that uses the panelist ID information (PDUID) as part of the encryption key generation, and further adds an encrypted shared library, and send the DCP to the data server 503. The PDUID information is stored and linked to the key. The data server 503 parses the DCP, and license information and key data are stored and linked to the PDUID. The encrypted decoding information, encrypted shared library, encrypted Diagnostic Information, and decryption key are then sent to an installation routine executed on the panelist device.

The installation routine decrypts and installs the shared library, places the encrypted decoding information and encrypted diagnostic information into the encrypted rule store, and validates the operation of the shared library by performing a diagnostic run. If the diagnostic run passes, normal operation is started.

Continuing with the example, under normal operation, the device application may request a decryption key from the data server 503 over a secure link using the PDUID when the panelist device needs to invoke the shared library. Data server 503 determines if the panelist device has a valid license. If the license is valid, the data server 503 sends the key to the panelist device over a secure link. The key is then used as input to the shared library during invocation and then the key is preferably deleted.

The shared library uses the input key to decrypt the decoding information, as well as diagnostic information (if used) as part of a set-up. The shared library is passed PCM audio data and operates on it to determine if encoding (CBET) detections are present. The device application periodically polls the shared library for detections. If the shared library has detections, it returns a linked list of detection structures that have as a field the IP sensitive message information encrypted using the input key. The device application adds information allowing the times of detection to be linked to GMT.

Enhanced detection information may be passed over a secure link to the data server 503 by the device application 502, along with the PDUID. The data server 503 would then pass the enhanced detection information to the interface server 504 over a secure link along with the associated PDUID as part of a periodic report. Interface server 504 could then validate that the enhanced detection information is associated with a known PDUID. If so, the detection information is passed to a collection transformation module (not shown), which may be located in the format module 505.

Although various embodiments of the present disclosure have been described with reference to a particular arrangement of parts, features and the like, these are not intended to exhaust all possible arrangements or features, and indeed many other embodiments, modifications and variations will be ascertainable to those of skill in the art.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A computer readable storage device comprising instructions which, when executed, cause a processor to at least:
   determine encoding data corresponding to one or more frequencies to be used to encode a message into audio data;
   generate a license file including the encoding data, the license file corresponding to the message to be encoded into the audio data, the message to be encoded into the audio data by an encoding device; and
   transmit the license file to a decoding device to enable the decoding device to decode the message from the audio data based on the license file.

2. The computer readable storage device of claim 1, wherein the encoding data includes a previously compiled table of information to encode the message into the audio data.

3. The computer readable storage device of claim 1, wherein the instructions cause the processor to generate the license file to include a security function, the security function including at least one of: (1) an encryption key, (2) control flow remapping, (3) variable renaming, or (4) an identification code.

4. The computer readable storage device of claim 3, wherein the security function includes data defining at least one of (1) messages, (2) symbols, or (3) code tone frequencies associated with the audio data.

5. The computer readable storage device of claim 3, wherein the security function includes a message code that identifies the encoding device.

6. The computer readable storage device of claim 5, wherein the message code includes at least one of (1) an identification, (2) an extension, or (3) a layer used to identify the encoding device.

7. The computer readable storage device of claim 1, wherein the instructions cause the processor to generate the license file to include a decoding algorithm used to determine if the audio data contains embedded message codes.

8. The computer readable storage device of claim 1, wherein the instructions cause the processor to associate the message with a shared library to be used to decode the message from the audio data.

9. The computer readable storage device of claim 1, wherein the license file includes symbol or bin information to decode the message from the audio data.

10. The computer readable storage device of claim 1, wherein the encoding device includes a first portion of symbol information or bin information to be used to encode the message into the audio data, and the license file includes a second portion of the symbol information or bin information to be used to encode the message into the audio data, the first and second portions of the symbol information or bin information to be sufficient to encode the message into the audio data.

11. The computer readable storage device of claim 1, wherein the instructions cause the processor to transmit the license file to the encoding device.

12. An apparatus to encode audio, the apparatus comprising:
    memory; and
    a processor to execute instructions to at least:
      determine encoding data corresponding to one or more frequencies to be used to encode a message into audio data;
      generate a license file including the encoding data, the license file corresponding to the message to be encoded into the audio data, the message to be encoded into the audio data by an encoding device; and
      transmit the license file to a decoding device to enable the decoding device to decode the message from the audio data based on the license file.

13. The apparatus of claim 12, wherein the encoding data includes a previously compiled table of information to encode the message into the audio data.

14. The apparatus of claim 12, wherein the processor is to generate the license file to include a security function, the security function including at least one of: (1) an encryption key, (2) control flow remapping, (3) variable renaming, or (4) an identification code.

15. The apparatus of claim 14, wherein the security function includes data defining at least one of (1) messages, (2) symbols, or (3) code tone frequencies associated with the audio data.

16. The apparatus of claim 14, wherein the security function includes a message code that identifies the encoding device.

17. The apparatus of claim 16, wherein the message code includes at least one of (1) an identification, (2) an extension, or (3) a layer used to identify the encoding device.

18. The apparatus of claim 12, wherein the processor is to generate the license file to include a decoding algorithm used to determine if the audio data contains embedded message codes.

19. The apparatus of claim 12, wherein the processor is to associate the message with a shared library to be used to decode the message from the audio data.

20. A method to protect audio data in an encoding system, the method comprising:
    determining, by executing an instruction with a processor, encoding data corresponding to one or more frequencies to be used to encode a message into audio data;
    generating, by executing an instruction with the processor, a license file including the encoding data, the license file corresponding to the message to be encoded into the audio data, the message to be encoded into the audio data by an encoding device; and
    transmitting the license file to a decoding device to enable the decoding device to decode the message from the audio data based on the license file.

* * * * *